(12) United States Patent
Qiu et al.

(10) Patent No.: US 12,394,192 B1
(45) Date of Patent: Aug. 19, 2025

(54) SMALL-SIZE VEHICLE DETECTION DEEP LEARNING MODEL BASED ON FEATURE FUSION OF MULTI-SCALE MODULES

(71) Applicant: Nanhu Laboratory, Zhejiang (CN)

(72) Inventors: Yicheng Qiu, Zhejiang (CN); Feng Sha, Zhejiang (CN); Li Niu, Zhejiang (CN)

(73) Assignee: Nanhu Laboratory, Zhejiang (CN)

( * ) Notice: Subject to any disclaimer, the term of this patent is extended or adjusted under 35 U.S.C. 154(b) by 0 days.

(21) Appl. No.: 19/005,689

(22) Filed: Dec. 30, 2024

(30) Foreign Application Priority Data

May 31, 2024 (CN) .......................... 202410698993.8
Sep. 11, 2024 (CN) .......................... 202411270814.7

(51) Int. Cl.
*G06V 10/82* (2022.01)
*G06V 20/58* (2022.01)

(52) U.S. Cl.
CPC .............. *G06V 10/82* (2022.01); *G06V 20/58* (2022.01)

(58) Field of Classification Search
None
See application file for complete search history.

(56) References Cited

U.S. PATENT DOCUMENTS

| 2024/0013505 | A1* | 1/2024 | Zheng | G06V 10/774 |
| 2024/0161461 | A1* | 5/2024 | Zu | G06N 3/04 |
| 2025/0005914 | A1* | 1/2025 | Qi | G06V 10/806 |
| 2025/0078541 | A1* | 3/2025 | Sun | G06V 20/64 |

FOREIGN PATENT DOCUMENTS

CN 117011727 A 11/2023

* cited by examiner

*Primary Examiner* — Leon Flores
(74) *Attorney, Agent, or Firm* — Millen, White, Zelano & Branigan P.C.; William F. Nixon

(57) ABSTRACT

A small-size vehicle detection deep learning model based on feature fusion of multi-scale modules is provided, which solves the problem of small-size vehicle image detection. The model includes a Backbone network, a Neck layer and a Head network, wherein a C2f_DCNv3 module based on the combination of deformable convolution v3 (DCNv3) and a cross stage feature fusion (C2f) module and an SPPF_L-SKA module based on the combination of a spatial pyramid pooling fast (SPPF) layer and a large separable kernel attention (LSKA) module are introduced into the Backbone network; a C2f_SCConv module based on the combination of spatial and channel reconstruction convolution (SCConv) and a C2f module is introduced into the Neck layer; and a multi-scale kernel detection (MSK_Detect) module is introduced into the Head network.

10 Claims, 6 Drawing Sheets

SMALL-SIZE VEHICLE DETECTION DEEP LEARNING MODEL BASED ON FEATURE FUSION OF MULTI-SCALE MODULES

CROSS-REFERENCE TO RELATED APPLICATION

This patent application claims the benefit and priority of Chinese Patent Application No. 2024106989938 filed with the China National Intellectual Property Administration on May 31, 2024, the disclosure of which is incorporated by reference herein in its entirety as part of the present application.

TECHNICAL FIELD

The present disclosure belongs to the technical field of vehicle recognition and detection, and in particular, relates to a small-size vehicle detection deep learning model based on feature fusion of multi-scale modules.

BACKGROUND

As a key branch in the field of computer vision, an object detection algorithm has experienced remarkable technological innovation and progress in recent years. In the early days, the object detection field mainly used a two-stage-based processing method, in which the typical representatives were Region-convolutional neural network (R-CNN) and FAST-R-CNN. The method selects candidate areas in the image, and then extracts features from each area and classifies. Although the method is effective, the processing speed is slow. Subsequently, in order to address the speed problem, an object detection algorithm based on a single stage appeared, such as famous You Only Look Once (YOLO) series and Single Shot MultiBox Detector (SSD). The method significantly improves the processing speed by completing the whole detection task in a single forward propagation of the network. The method regards object detection as a regression problem, and directly predicts the bounding box and category probability in the image, so as to realize fast and efficient detection. At present, the relatively advanced YOLOv8 model has shown an excellent effect and performance in the object detection task of conventional vehicles in the traffic field. However, when facing small-size vehicle objects, its detection effect is not good. It is impossible to recognize and position the objects quickly and accurately.

In order to solve the shortcomings of the existing technology, people have made long-term exploration and put forward various solutions. For example, Chinese patent application No. 202310889055.1 discloses an unmanned aerial vehicle small object image detection method based on multiheads-YOLOv5, which is realized by the following steps. Step 1, the same Feature Pyramid Network (FPN)+ Pyramid Attention Network (PAN) up-sampling and down-sampling structures are constructed. These structures include common structures of deep learning networks such as Conv, Upsample and Concat, and the two up-sampling and down-sampling network structures such as C3 module, Conv, Concat and C3. These structures are used to extract the feature form of the original model. Step 2, for the Neck structure of the original model YOLOv5, the FPN+PAN structure constructed in Step 1 is referenced, which deepens the depth of the network structure of the original model, so that smaller feature information can be extracted for detecting objects with a small object scale. Step 3, through the C3 module of the up-sampling and down-sampling structures newly added in the Neck part of the model, the head in YOLOv5 is connected to complete the detection task of micro-scale small objects.

The above scheme solves the problem of object detection to a certain extent, but there are still many shortcomings in the scheme, such as the inability to quickly recognize and position small-size vehicles.

SUMMARY

Aiming at the above problem, the purpose of the present disclosure is to provide a small-size vehicle detection deep learning model based on feature fusion of multi-scale modules, which is reasonable in design and excellent in recognizing and positioning effects for small-size vehicles.

In order to achieve the above purpose, the present disclosure uses the following technical scheme: a small-size vehicle detection deep learning model based on feature fusion of multi-scale modules, which includes a Backbone network, a Neck layer and a Head network, wherein a C2f_DCNv3 module based on the combination of deformable convolution v3 (DCNv3) and a cross stage feature fusion (C2f) module and an SPPF_LSKA module based on the combination of a spatial pyramid pooling fast (SPPF) layer and a large separable kernel attention (LSKA) module are introduced into the Backbone network to extract features of a small-size vehicle image; a C2f_SCConv module based on the combination of spatial and channel reconstruction convolution (SCConv) and a C2f module is introduced into the Neck layer to process the features extracted by the Backbone network; and a multi-scale kernel detection (MSK_Detect) module is introduced into the Head network to predict the extracted features of the small-size vehicle image.

In the small-size vehicle detection deep learning model based on feature fusion of multi-scale modules described above, the input and output of the C2f_DCNv3 module pass through convolution layers Convs, and two layers of DCNv3 are introduced into a bottleneck layer in the middle of the C2f_DCNv3 module.

In the small-size vehicle detection deep learning model based on feature fusion of multi-scale modules described above, the calculation process of the DCNv3 is as follows:

$$y_0 = \sum_{g=1}^{G}\sum_{k=1}^{K} W_g W_{gk} x_g (p_0 + p_k + \Delta p_{gk});$$

where $y_0$ denotes an output result obtained by DCNv3 operation on a feature map at a position $p_0$; G denotes the number of aggregation groups, which represents the use of a plurality of spatial positions to learn a plurality of spatial aggregation modes in the DCNv3; K denotes the total number of sampling areas; $W_g$ denotes a convolution kernel weight in sampling operation; $M_{gk} \in (0,1)$ denotes a modulation scalar, which is a normalized coefficient for adjusting a contribution weight of each sampling area; $x_g$ denotes an input feature map; $p_k$ denotes a position of the k-th sampling area in a convolution kernel; and $\Delta p_{gx}$ denotes a offset of the sampling area, allowing the convolution kernel to adjust its shape adaptively.

In the small-size vehicle detection deep learning model based on feature fusion of multi-scale modules described above, the input and output of the C2f_SCConv module pass through convolution layers Convs, two layers of SCConv are introduced into a bottleneck layer in the middle of the C2f_SCConv module, and the SCConv is formed by combining a spatial reconstruction unit (SRU) and a channel reconstruction unit (CRU).

In the small-size vehicle detection deep learning model based on feature fusion of multi-scale modules described above, the formula of GroundNorm in the SRU is:

$$GroundNorm(X) = \gamma \frac{X - \mu}{\sqrt{\sigma^2 + \varepsilon}} + \beta;$$

where $\gamma \in R^C$ is a trainable affine transformation, the information weight $W \in R^C$ is obtained by carrying out Standard normalization on $\gamma$, the information-rich weight $W_{up}$ and the information-less weight $W_{low}$ are obtained by carrying out threshold-based Gate operation on W, and an input passes through these weights to obtain $X_1$ and $X_2$, which are spliced based on channels after being subjected to ½ split based on channels and then being interleaved and multiplied.

In the small-size vehicle detection deep learning model based on feature fusion of multi-scale modules described above, input data are divided by the CRU based on α, then subjected to a upper-layer convolution operation and a lower-layer convolution operation, and then to channel splicing after experiencing a operation based on AvgPooling and Softmax, wherein the upper-layer convolution operation includes k×k and 1×1 convolution kernels, the lower-layer convolution operation includes 1×1 convolution kernel and simple skip-connection.

In the small-size vehicle detection deep learning model based on feature fusion of multi-scale modules described above, in the SPPF_LSKA module, an input passes through three MaxPooling layers after passing through a first convolution layer Conv, to obtain outputs from respective MaxPooling layers, which are spliced and then passes through the LSKA module and a convolution layer Conv to obtain the output.

In the small-size vehicle detection deep learning model based on feature fusion of multi-scale modules described above, the LSKA module is constructed by a plurality of convolution layers Convs, and the convolution kernels in respective convolution layers Convs are different, which are a horizontal convolution kernel 1×(2d−1), a vertical convolution kernel (2d−1)×1, a horizontal convolution kernel 1×k/d, a vertical convolution kernel k/d×1, and a convolution kernel of a 1×1 unit in sequence, where k denotes the size of an original convolution kernel, and d denotes the dilation rate of convolution.

In the small-size vehicle detection deep learning model based on feature fusion of multi-scale modules described above, the MSK_Detect module carries out a channel separation operation through a split operation, and the output obtained through the split operation passes through the convolution layers Convs of a plurality of convolution kernels with different sizes; after decoupling by a convolution layer Conv of a 1×1 convolution kernel, output results of an object bounding box and an object classification are obtained by two 1×1 convolution layers Convs, respectively.

In the small-size vehicle detection deep learning model based on feature fusion of multi-scale modules described above, the small object detection deep learning model is improved based on an object detection model YOLOv8.

Compared with the previous work, the present disclosure has the following advantages. The C2f_DCNv3 module is introduced into the Backbone network, which can realize a rich feature extraction capability, provides a powerful and efficient Backbone network basis for the whole model, and ensures the high performance and robustness of the whole model in dealing with the feature extraction task of small-size vehicle images. In the Backbone network, the SPPF_LSKA module is introduced into the deep structure of the Backbone network. When fusing the deep receptive fields of different scales, the SPPF_LSKA module captures more long-range dependencies in the small-size vehicle feature map, as well as better spatial and channel adaptability, based on the LSKA module. The combination of block construction has the advantages of high efficiency, easy integration, optimized parameter configuration and reduced parameter quantity, which reduces the calculation and storage costs. In the Neck layer, the C2f_SCConv module is introduced. The C2f_SCConv module has the advantages of high efficiency, easy integration, optimized parameter configuration and reduced parameter quantity, which reduces the calculation and storage costs and provides better performance than traditional convolution operation. In the Head network, the MSK_Detect module is introduced, which improves the diversity of feature expression of small-size vehicle images and enhances the generalization ability of the network in the face of complex features. At the same time, the design of the MSK_Detect module reduces the parameter quantity.

DETAILED DESCRIPTION OF THE EMBODIMENTS

The present disclosure will be further described in detail with reference to the attached drawings and the detailed description.

Figure 1:
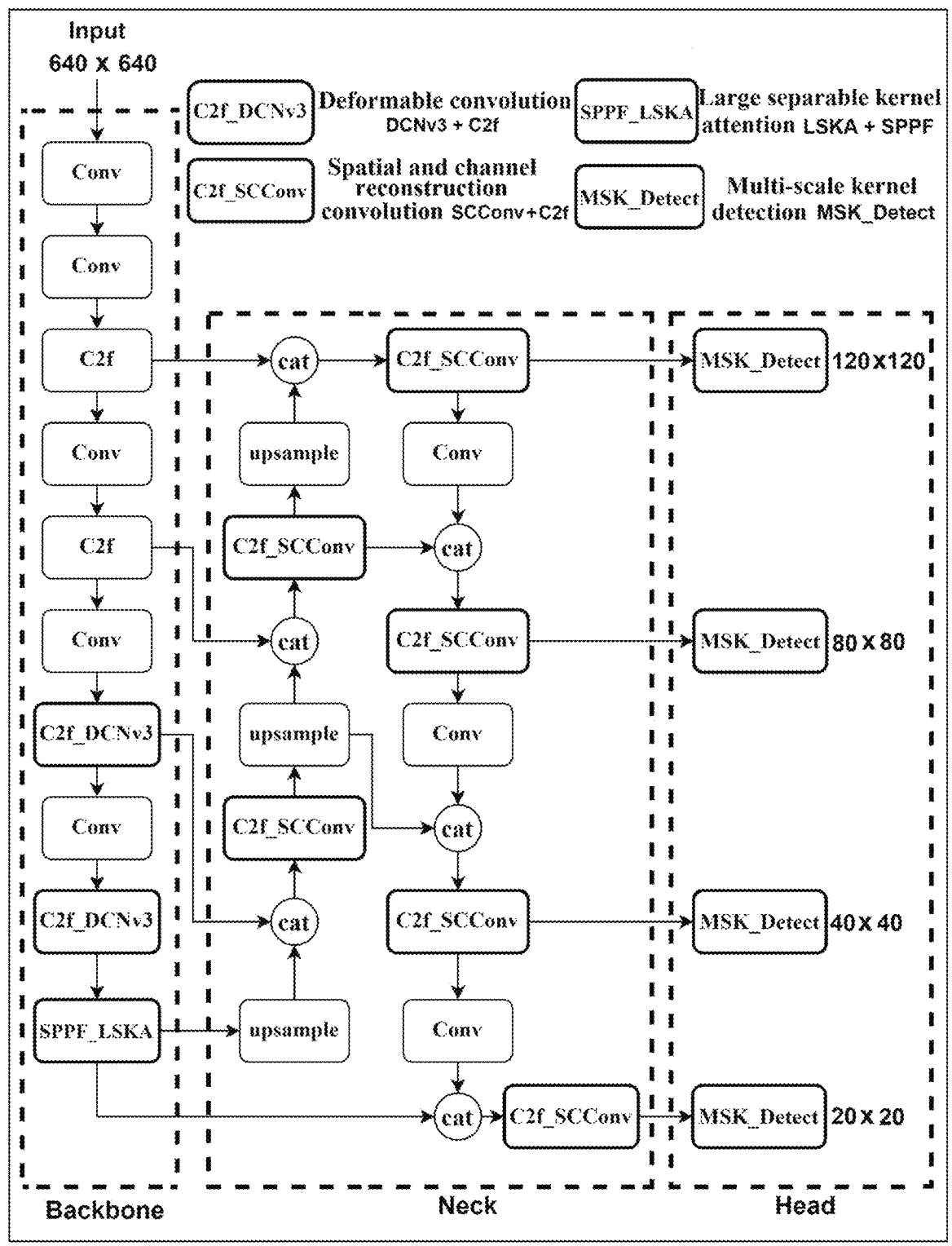
FIG. 1 is an overall architecture diagram of a model according to the present disclosure.

As shown in FIG. 1, a small-size vehicle detection deep learning model based on feature fusion of multi-scale modules can improve the safety of automatic driving and help vehicles quickly and accurately recognize small obstacles such as road signs, pedestrians and bicycles, thus better ensuring driving safety. On the other hand, the model can also improve the efficiency of security monitoring and help the monitoring system quickly and accurately recognize small objects such as suspicious people and vehicles, thus better ensuring public safety. Specifically, the model includes a Backbone network, a Neck layer and a Head network. A C2f_DCNv3 module based on the combination of deformable convolution v3 (DCNv3) and a cross stage feature fusion (C2f) module and an SPPF_LSKA module based on the combination of a spatial pyramid pooling fast (SPPF) layer and a large separable kernel attention (LSKA) module are introduced into the Backbone network to extract features of a small-size vehicle image; a C2f_SCConv module based on the combination of spatial and channel reconstruction convolution (SCConv) and a C2f module is introduced into the Neck layer to process the features extracted by the Backbone network; and a multi-scale kernel detection (MSK_Detect) module is introduced into the Head network to predict the extracted features of the small-size vehicle image. Through the above small object detection deep learning model, a detection task of a small-size vehicle object in the complex image can be effectively processed. The small-size vehicle is one of small objects having a small pixel footprint in an input image. Small object detection is a particular case of object detection where various techniques are employed to detect small objects in digital images and videos. It can generally be considered that small-size vehicles refer to vehicles in images or videos whose pixel area is less than a certain threshold. The threshold may be, but is not limited to, 32*32. The threshold may be one-fifth of the pixel area of an image or video.

Figure 2:
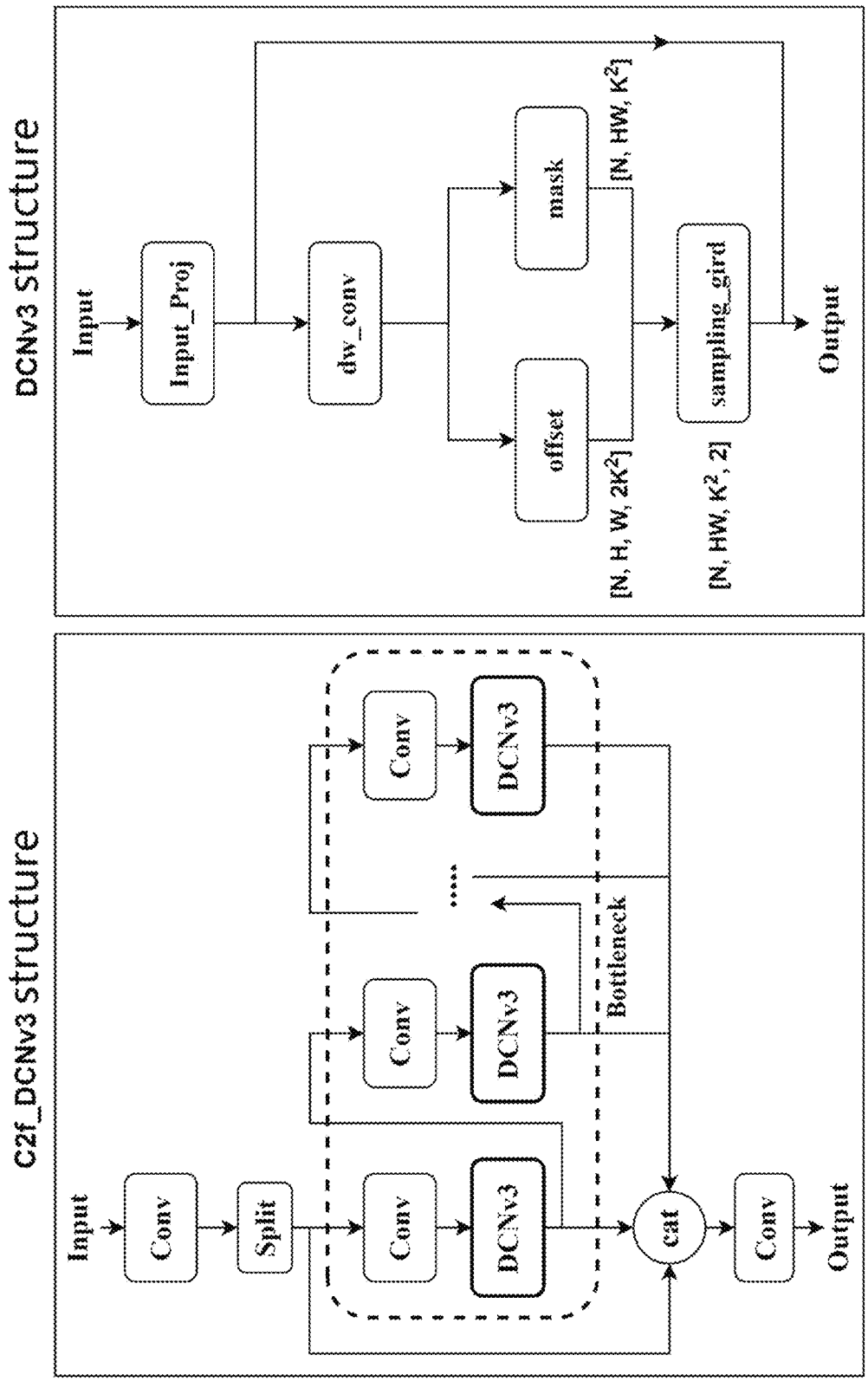
FIG. 2 is a schematic structural diagram of the C2f_DCNv3 module and the deformable convolution v3 (DCNv3) according to the present disclosure.

As shown in FIG. 2, the structure of the C2f_DCNv3 module based on the combination of the DCNv3 and the C2f module and the overall structure of the DCNv3 are shown, respectively. The left part of FIG. 2 shows the propagation structure of the C2f_DCNv3 module. First, the input and output of the C2f_DCNv3 module passes through a convolution layer Conv, and two layers of DCNv3 are introduced into a bottleneck layer in the middle of the C2f_DCNv3 module, in which various types of multi-layer modules can be introduced into the bottleneck layer. The right part of FIG. 2 describes the structure of the DCNv3. Based on the propagation operation and the tensor operation of the offset weight offset and the scalar weight mask, the sampling graph sampling grid is obtained as the sampling operation area of the DCNv3. Finally, the output of the DCNv3 is obtained.

Thoroughly, the specific calculation process of the DCNv3 is as follows:

$$y_0 = \sum_{g=1}^{G} \sum_{k=1}^{K} W_g W_{gk} x_g(p_0 + p_k + \Delta p_{gk});$$

where $y_0$ denotes the output result obtained by DCNv3 operation on a value of a feature map at the position $p_0$; G denotes the number of aggregation groups, which represents the use of a plurality of spatial positions to learn a plurality of spatial aggregation modes in the DCNv3; K denotes the total number of sampling areas; $W_g$ denotes the convolution kernel weight in sampling operation; $M_{gk} \in (0,1)$ denotes a modulation scalar, which is a normalized coefficient for adjusting the contribution weight of each sampling area; $x_g$ denotes an input feature map; $p_k$ denotes the position of the k-th sampling area in the convolution kernel; and $\Delta p_{gk}$ denotes the offset of the sampling area, allowing the convolution kernel to adjusting its shape adaptively.

The constructed C2f_DCNv3 module, as a key part of the Backbone network of the model of the present disclosure, has a powerful feature extraction capability. By introducing a long-range dependence and adaptive spatial aggregation mechanism, the module can effectively process large-scale image data, and then learn more powerful and robust feature representation. The C2f_DCNv3 module has a higher efficiency in parameter usage. Through weight sharing and the introduction of a plurality of groups of mechanisms, the rich feature extraction capability is realized while ensuring the parameter and the calculation efficiency. In addition, the C2f_DCNv3 module shows excellent stability in the training process, which effectively reduces the unstable factors that may occur in the training process. The improvement of stability not only optimizes the training process, but also helps to improve the generalization ability and the reliability of the model. To sum up, the addition of the C2f_DCNv3 module provides a powerful and efficient Backbone network basis for the model of the present disclosure, and ensures the high performance and robustness of the whole model in dealing with complex visual tasks.

Figure 3:
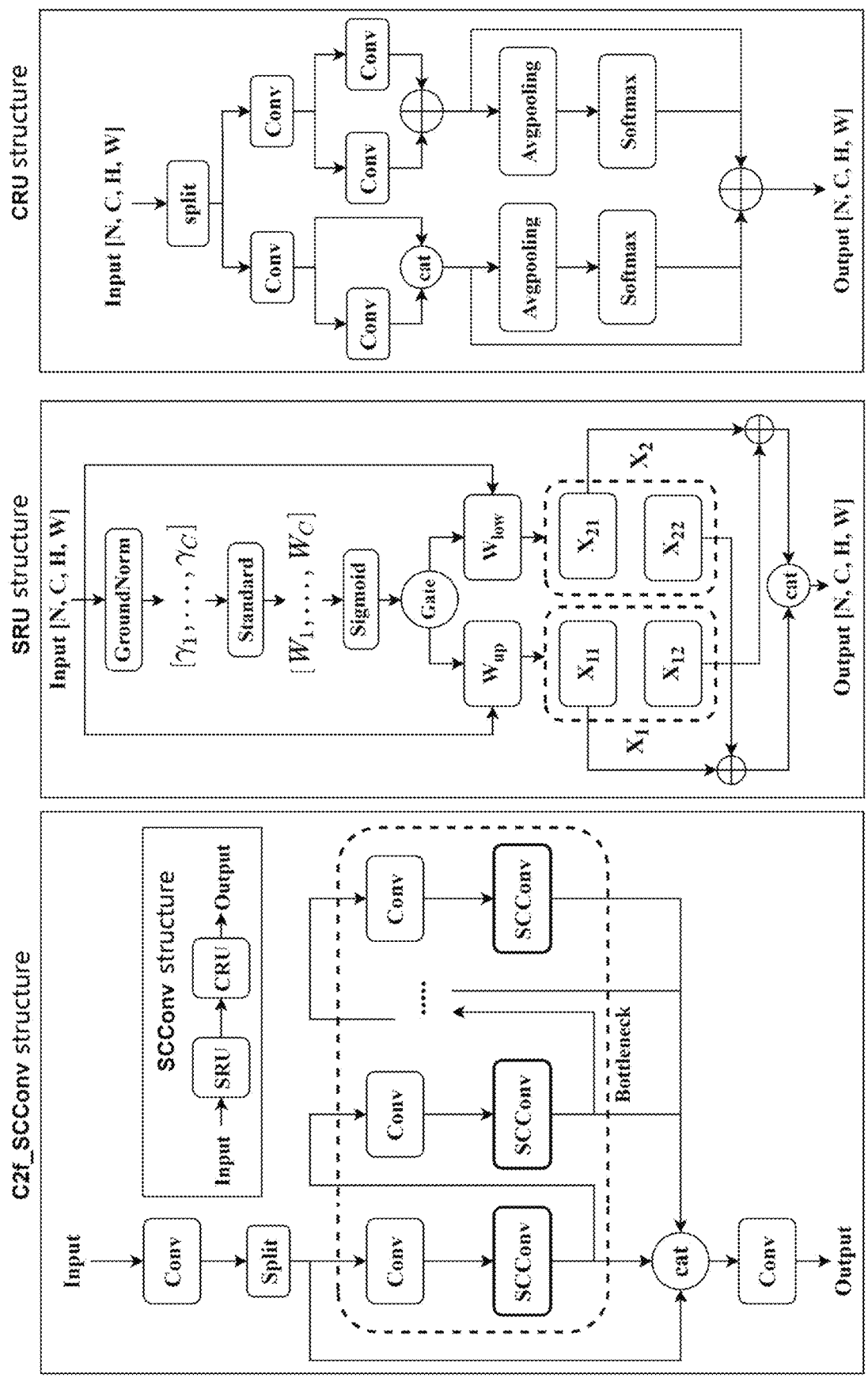
FIG. 3 is a schematic structural diagram of the C2f_SCConv module and spatial and channel reconstruction convolution (SCConv) according to the present disclosure.

As shown in FIG. 3, the structure of the C2f_SCConv module constructed based on the combination of the SCConv and the C2f module and the overall structure of the SCConv module are shown. The left part of FIG. 3 shows the propagation structure of the C2f_SCConv module, which is similar to the framework of the C2f in the C2f_DCNv3 module. The input and output of the C2f_SCConv module pass through convolution layers Convs, two layers of SCConv are introduced into the bottleneck layer in the middle of the C2f_SCConv module, and the SCConv is formed by combining a spatial reconstruction unit (SRU) and a channel reconstruction unit (CRU).

Still further, the middle part of FIG. 3 shows the structure of the SRU. The formula of GroundNorm in the SRU is:

$$GroundNorm(X) = \gamma \frac{X - \mu}{\sqrt{\sigma^2 + \varepsilon}} + \beta;$$

where $\gamma \in R^C$ is a trainable affine transformation, the information weight $W \in R^C$ is obtained by carrying out Standard normalization on $\gamma$, the information-rich weight $W_{up}$ and the information-less weight $W_{low}$ are obtained by carrying out threshold-based Gate operation on W, and an input is passed through these weights to obtain $X_1$ and $X_2$, which are spliced based on channels after being subjected to ½ split based on channels and then being interleaved and multiplied. X is the input, $X_2$ and $X_2$ are output after being subjected to ½ split, $\mu$ is the mean value of X, $\beta$ is the bias, which is a trainable parameter, $\sigma$ is the standard deviation of X, c is the number of channels, and $\varepsilon$ is $1*10^{-10}$.

In addition, the right part of FIG. 3 shows the structure of the CRU. The input data are divided by the CRU based on $\alpha$, and subsequently subjected to the upper-layer convolution operation and the lower-layer convolution operation, and then to channel splicing after experiencing a operation based on AvgPooling and Softmax, wherein the upper-layer convolution operation includes k×k and 1×1 convolution kernels, the lower-layer convolution operation includes 1×1 convolution kernel and simple skip-connection.

The SCConv enhances the information flow between features through a separation and reconstruction method and a cross-reconstruction method, thus improving the efficiency and the expressive ability of feature extraction and reducing spatial redundancy. The SCConv can capture and express important information in images more accurately, especially when dealing with complex and subtle features. In the present disclosure, the C2f_SCConv module will be introduced into the Neck layer. The C2f_SCConv module has the advantages of high efficiency, easy integration, optimized parameter configuration and reduced parameter quantity, which reduces the calculation and storage costs and provides better performance than traditional convolution operation.

Figure 4:
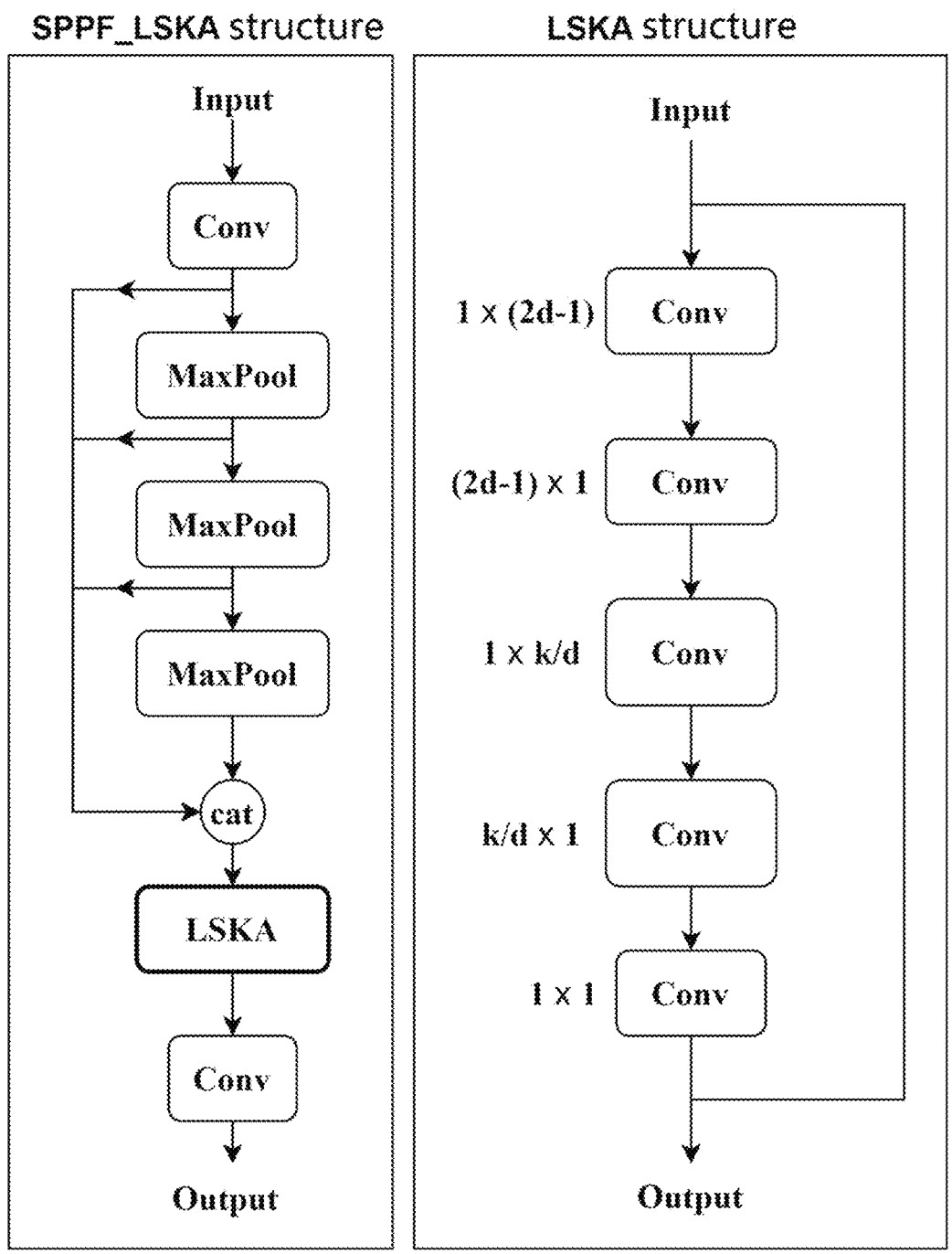
FIG. 4 is a schematic structural diagram of the SPPF_LSKA module and the large separable kernel attention (LSKA) module according to the present disclosure.

As shown in FIG. 4, the overall structure of the SPPF_LSKA module constructed based on the combination of the LSKA and the SPPF layer and the internal structure of the LSKA are shown. The left part of FIG. 4 shows the propagation path of the SPPF_LSKA module structure. The SPPF_LSKA module passes through three MaxPooling layers after passing through a first convolution layer Conv, splices the output obtained by each MaxPooling layer, and then passes through the LSKA module and the convolution layer Conv to obtain the output.

It can be seen that the right part of FIG. 4 shows the internal structure of the LSKA module. The LSKA module is constructed by a plurality of convolution layers Convs, and the convolution kernels in respective convolution layers Convs are different, which are a horizontal convolution kernel 1×(2d−1), a vertical convolution kernel (2d−1)×1, a horizontal convolution kernel 1×k/d, a vertical convolution kernel k/d×1, and a convolution kernel of a 1×1 unit in sequence, where k denotes the size of an original convolution kernel, and d denotes the dilation rate of convolution.

The LSKA aims to solve the problem that the calculation and memory occupation of a deep convolution layer increases linearly with the size of the convolution kernel. By decomposing the 2D convolution kernel into horizontal and vertical 1D convolution kernels, the LSKA can directly use the large convolution kernel in the deep convolution layer without any additional modules. The LSKA decomposes the 2D weight kernels in the depth convolution and in the depth dilation convolution into two cascaded 1D separable weight kernels, which not only reduces the calculation complexity, but also maintains the performance equivalent to the traditional large convolution kernel module.

The advantages of the LSKA are as follows. 1. Long-range dependence: the LSKA effectively captures the long-range dependence in the image, which is a key component of the self-attention mechanism in the converter. The LSKA provides an alternative method for capturing global information through the design of a large convolution kernel. 2. Spatial and channel adaptability: the LSKA inherits the spatial attention and channel attention strategies of the traditional large convolution kernel, and the two strategies adaptively recalibrate the weight of features according to the context dependence. Compared with the self-attention and the large kernel attention (LKA) module, the LSKA has better spatial and channel adaptability while maintaining parameters and calculation complexity to be lower. 3. Reduction of the calculation complexity and the memory occupation: compared with the standard traditional large convolution kernel module, the calculation complexity and the memory occupation are significantly reduced.

In the present disclosure, the SPPF_LSKA module is introduced into the deep structure of the Backbone network, and captures more long-range dependencies in the feature, as well as better spatial and channel adaptability, based on the LSKA module while fusing the deep receptive fields of different scales.

Figure 5:
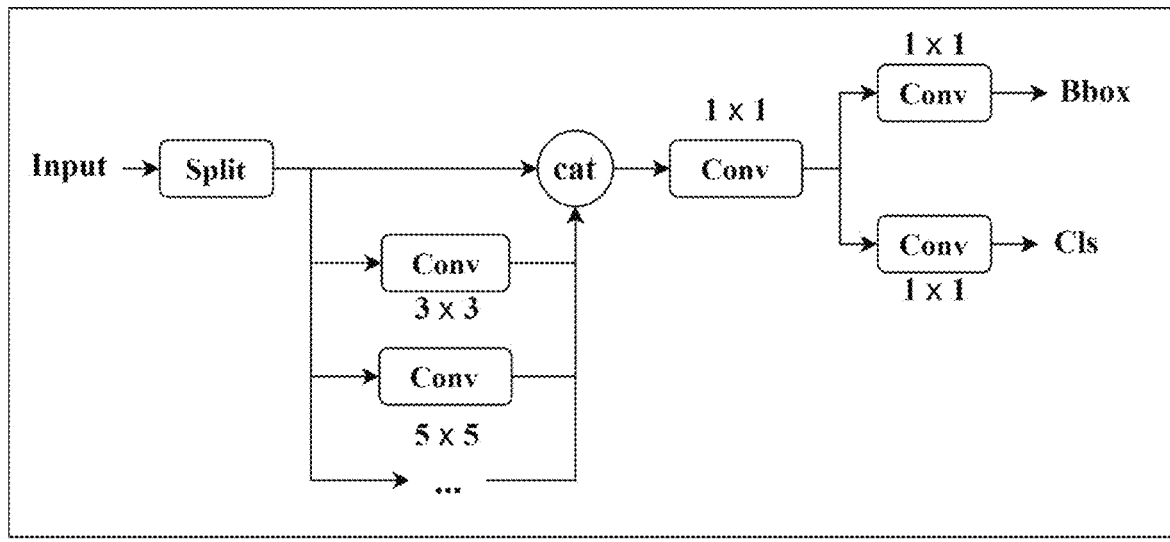
FIG. 5 is a schematic structural diagram of the multi-scale kernel detection (MSK_Detect) module according to the present disclosure.

As shown in FIG. 5, the structure of the MSK_Detect is shown. The MSK_Detect module carries out a channel separation operation through a split operation, and the output obtained through the split operation passes through the convolution layers Convs of a plurality of convolution kernels with different sizes. In the present disclosure, two convolution kernels 3×3 and 5×5 will be selected to form a multi-scale convolution kernel. After decoupling by the convolution layer Conv of the 1×1 convolution kernel, the output results of an object bounding box and an object classification are obtained by two 1×1 convolution layers Convs, respectively.

The multi-scale kernel (MSK) module has a multi-scale convolution kernel, which can capture features of different levels, thus improving the diversity of feature expression, enhancing the generalization ability of the network in the face of complex features, and making the model to show better performance and adaptability in a wider range of application scenarios. At the same time, the design of the MSK module reduces the parameter quantity of the module. By optimizing the use and fusion strategy of the convolution kernel, the MSK module realizes the optimization of parameter calculation efficiency, thus reducing the calculation cost and the space occupation. In the present disclosure, the MSK module is introduced into the head layer to construct a MSK_Detect module. The MSK_Detect module can effectively improve the ability to capture and process the features of small-size vehicle objects with different sizes by applying the multi-scale convolution kernel. The multi-scale method enables the module to understand the content of small-size vehicles at different levels, thus improving the accuracy and robustness of small-size vehicle detection.

In some embodiments, the small object detection deep learning model is improved based on an object detection model YOLOv8. The effectiveness of the method is verified. The following comparative experiments are conducted for test.

Based on the large-scale image dataset visdrone in the real scene, which contains small-size vehicles, the deep learning experiment process is constructed. The samples in the dataset are diverse and abundant, including many types of vehicles. The YOLOv8 algorithm and the proposed small-size object detection model based on feature fusion of multi-scale modules are used for training, and the test is carried out based on the test set. The experimental test results show that, on the test dataset, the model performance is evaluated based on the evaluation index of mean Average Precision (mAP). The YOLOv8 model achieves 49.7% of mAP50 and 30.3% of overall mAP, while the model proposed in the present disclosure achieves 52.5% of mAP and 32.1% of overall mAP. These results show that the model proposed in the present disclosure shows better performance than the traditional YOLOv8 method in the detection task of small-size vehicle objects in large-size images in the real scene.

The following table shows the comparison between YOLOv8 model and the small-size vehicle detection deep learning model based on feature fusion of multi-scale modules proposed in the present disclosure in the performance indexes of the small-size vehicle object detection dataset, which shows the improvement of the method provided in the present disclosure with respect to the performance.

|  | Precision | Recall | mAP50 | mAP50-95 |
|---|---|---|---|---|
| YOLOv8l | 60.74% | 49.77% | 49.71% | 30.32% |
| YOLOv8x | 61.01% | 50.24% | 50.32% | 31.03% |
| Ours | 62.62% | 52.85% | 52.51% | 32.12% |

Figure 6A:
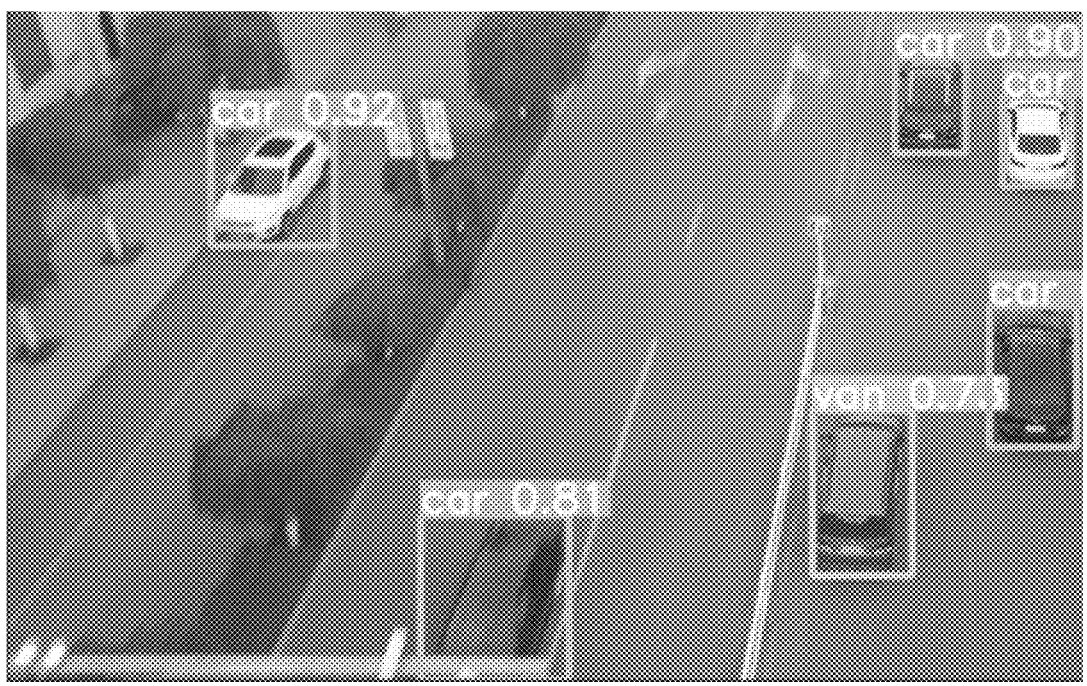
FIG. 6A is a picture showing the detection results of the original YOLOv8 model.
Figure 6B:
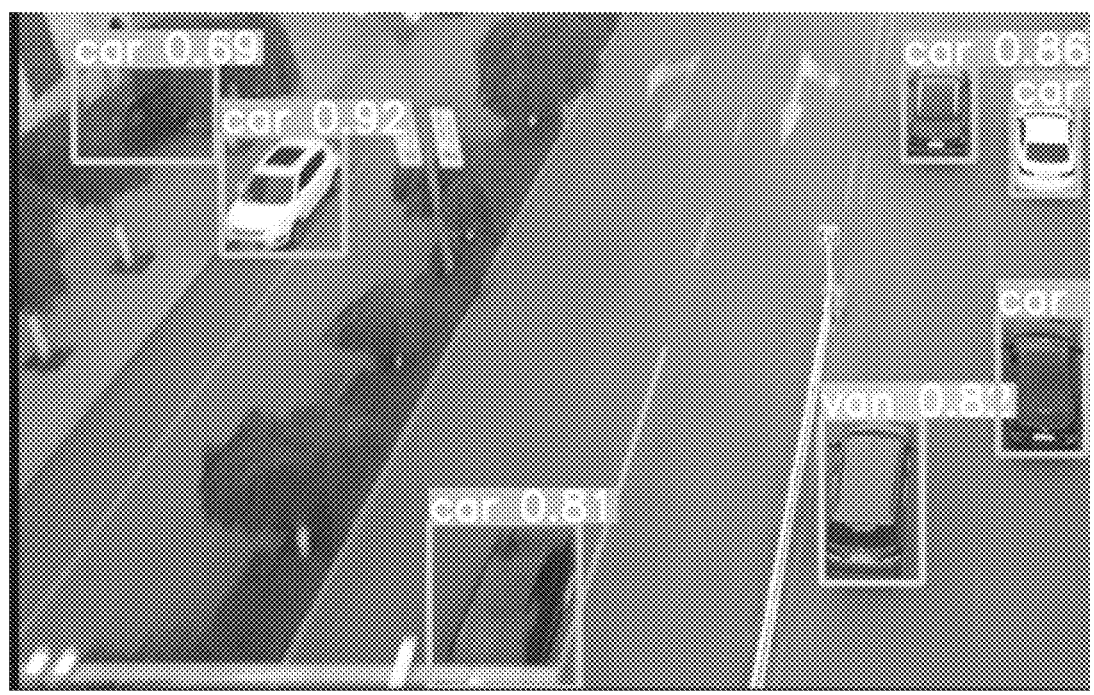
FIG. 6B is a picture showing the detection results of the proposed new model.

A comparative example of the results of small-size vehicle object detection in the real scene is provided, in which FIG. 6A is a picture showing the detection results of the original YOLOv8 model, and FIG. 6B is a picture showing the detection results of the proposed new model.

Compared with the YOLOv8 model, the model of the present disclosure can detect small-size vehicle objects better.

To sum up, the principles of the embodiment are as follows. Based on the overall structural style of the YOLOv8, many improvements are made to construct a deep network feature head for a small object vehicle size, so that the model is more suitable for learning the feature size of a small object vehicle. The DCNv3 is introduced into the backbone network to improve the processing ability and stability of input features. A LSKA module is introduced into the deep stage of the backbone network to better capture the global information of features. The SCConv is introduced into the Neck layer, which can effectively reduce the redundancy of the convolution network and improve the performance and the efficiency of the network, and which has a better recognizing and positioning effect for small-size vehicle objects.

The specific embodiments described herein are only illustrative of the spirit of the present disclosure. Those skilled in the technical field to which the present disclosure belongs can make various modifications or supplements to the described specific embodiments or substitute the described specific embodiments in a similar manner, which will not deviate from the spirit of the present disclosure or go beyond the scope defined in the appended claims.

Although many terms such as a Backbone network, a Neck layer and a Head network are used herein, the possibility of using other terms is not excluded. These terms are only used to describe and explain the essence of the present disclosure more conveniently; and the interpretation of the terms as any additional restrictions is against the spirit of the present disclosure.

What is claimed is:

1. A computer system comprising a small object detection deep learning model based on feature fusion of multi-scale modules, the small object detection deep learning model comprising:
   a Backbone network, into which a C2f_DCNv3 module based on a combination of deformable convolution v3 (DCNv3) and a cross stage feature fusion (C2f) module and an SPPF_LSKA module based on a combination of a spatial pyramid pooling fast (SPPF) layer and a large separable kernel attention (LSKA) module are introduced, for extracting features of a small object image;
   a Neck layer, into which a C2f_SCConv module based on a combination of spatial and channel reconstruction convolution (SCConv) and a C2f module, for processing features extracted by the Backbone network; and
   a Head network, into which a multi-scale kernel detection (MSK_Detect) module for predicting the extracted features of the small object image,
   wherein a small object in the small object image is a vehicle.

2. The computer system comprising the small object detection deep learning model according to claim 1, wherein
   an input and an output of the C2f_DCNv3 module pass through convolution layers Convs, and
   two layers of DCNv3 are introduced into a bottleneck layer in a middle of the C2f_DCNv3 module.

3. The computer system comprising the small object detection deep learning model according to claim 2, wherein a calculation process of the DCNv3 is as follows:

$$y_0 = \sum_{g=1}^{G}\sum_{k=1}^{K} W_g W_{gk} x_g (p_0 + p_k + \Delta p_{gk});$$

where $y_0$ denotes an output result obtained by DCNv3 operation on a value of a feature map at a position $p_0$; G denotes a number of aggregation groups, which represents a use of a plurality of spatial positions to learn a plurality of spatial aggregation modes in the DCNv3; K denotes a total number of sampling areas; $W_g$ denotes a convolution kernel weight in sampling operation; $M_{gk} \in (0,1)$ denotes a modulation scalar, which is a normalized coefficient for adjusting a contribution weight of each sampling area; $x_g$ denotes an input feature map; $p_k$ denotes a position of a k-th sampling area in a convolution kernel; and $\Delta p_{gk}$ denotes a offset of the sampling area, allowing the convolution kernel to adjust its shape adaptively.

4. The computer system comprising the small object detection deep learning model according to claim 1, wherein
   an input and an output of the C2f_SCConv module pass through convolution layers Convs,
   two layers of SCConv are introduced into a bottleneck layer in a middle of the C2f_SCConv module, and
   the SCConv is formed by combining a spatial reconstruction unit (SRU) and a channel reconstruction unit (CRU).

5. The computer system comprising the small object detection deep learning model according to claim 4, wherein a formula of GroundNorm in the SRU is:

$$GroundNorm(X) = \gamma \frac{X - \mu}{\sqrt{\sigma^2 + \varepsilon}} + \beta;$$

where $\gamma \in R^C$ is a trainable affine transformation, an information weight $W \in R^C$ is obtained by carrying out Standard normalization on Y, an information-rich weight $W_{up}$ and an information-less weight $W_{low}$ are obtained by carrying out threshold-based Gate operation on W, and an input passes through these weights to obtain $X_1$ and $X_2$, which are spliced based on channels after being subjected to ½ split based on channels and then being interleaved and multiplied, X is an input, $X_1$ and $X_2$ are output after being subjected to ½ split, μ is a mean value of X, β is a bias, which is a trainable parameter, σ is a standard deviation of X, c is a number of channels, R represents a set of real numbers, and ε is $1*10^{-10}$.

6. The computer system comprising the small object detection deep learning model according to claim 4, wherein
   input data are divided by the CRU based on α, then subjected to a upper-layer convolution operation and a lower-layer convolution operation, and then to channel splicing after experiencing a operation based on AvgPooling and Softmax, wherein the upper-layer convolution operation comprises k×k and 1×1 convolution kernels, the lower-layer convolution operation comprises 1×1 convolution kernel and simple skip-connection.

7. The computer system comprising the small object detection deep learning model according to claim 1, wherein in the SPPF_LSKA module, an input passes through three MaxPooling layers after passing through a first convolution layer Conv, to obtain outputs from respective MaxPooling layers, which are spliced and then pass through the LSKA module and a convolution layer Conv to obtain an output.

8. The computer system comprising the small object detection deep learning model according to claim 7, wherein the LSKA module is constructed by a plurality of convolution layers Convs, and convolution kernels in respective convolution layers Convs are different, which are a horizontal convolution kernel 1×(2d−1), a vertical convolution kernel (2d−1)×1, a horizontal convolution kernel 1×k/d, a vertical convolution kernel k/d×1, and a convolution kernel of a 1×1 unit in sequence, where k denotes a size of an original convolution kernel, and d denotes a dilation rate of convolution.

9. The computer system comprising the small object detection deep learning model according to claim 1, wherein the MSK_Detect module carries out a channel separation operation through a split operation, and output obtained through the split operation passes through convolution layers Convs of a plurality of convolution kernels with different sizes; after decoupling by a convolution layer Conv of a 1×1 convolution kernel, output results of an object bounding box and an object classification are obtained by two 1×1 convolution layers Convs, respectively.

10. The computer system comprising the small object detection deep learning model according to claim 1, wherein the small object detection deep learning model is improved based on an object detection model You Only Look Once version 8 (YOLOv8).

* * * * *